United States Patent [19]

Raj et al.

[11] Patent Number: 4,526,382
[45] Date of Patent: Jul. 2, 1985

[54] RADIALLY POLARIZED MULTIPLE-STAGE FERROFLUID SEAL APPARATUS

[75] Inventors: Kuldip Raj, Merrimack; Hanumaiah L. Gowda, Nashua, both of N.H.

[73] Assignee: Ferrofluidics Corporation, Nashua, N.H.

[21] Appl. No.: 606,586

[22] Filed: May 3, 1984

[51] Int. Cl.³ .............................................. F16J 15/40
[52] U.S. Cl. .................................... 277/80; 277/135
[58] Field of Search .................................. 277/80, 135

[56] References Cited

FOREIGN PATENT DOCUMENTS 655858 4/1979 U.S.S.R. .................................. 277/80
892075 12/1981 U.S.S.R. .................................. 277/80

*Primary Examiner*—Robert I. Smith
*Attorney, Agent, or Firm*—Richard P. Crowley

[57] ABSTRACT

A compact, low cost, radially polarized multiple-stage ferrofluid seal apparatus which comprises a magnetically permeable housing, a magnetically permeable shaft to be sealed extending through the housing, one or more radially polarized permanent magnets to define a plurality of separate, spaced apart radial gaps between one polarized end of the permanent magnet and the surface of the shaft, ferrofluid in the radial gaps to define one or more separate, spaced apart ferrofluid O-ring seals about the surface of the shaft and a magnetically permeable bearing assembly adjacent to and in a magnetic flux relationship with at least one of the radial polarized magnets wherein the magnetic flux circuit extends between the radial polarized magnet, the housing, the bearing assembly, the shaft, and the ferrofluid in the radial gaps.

12 Claims, 3 Drawing Figures

4,526,382

RADIALLY POLARIZED MULTIPLE-STAGE FERROFLUID SEAL APPARATUS

BACKGROUND OF THE INVENTION

Ferrofluid seal apparatuses are known for sealing rotary shaft elements, such as for use as an exclusion-type seal or as a pressure capacity-type seal. Such ferrofluid seal apparatus provides an effective seal between different environments, either at the same or at different pressures or having the same or different environments.

U.S. Pat. No. 4,293,137, Issued Oct. 6, 1981 relates to the use of a ferrofluid seal apparatus which comprises a single axial permanent magnet in the shape of a flat washer element surrounding a rotatable shaft; and which flat washer element captures ferrofluid on the inside or outside diameter of the washer element. The flat washer element provides a ferrofluid seal between a housing and the exterior surface of the washer element or between the interior surface of the washer element and a rotatable shaft surface. In addition, such axial polarized permanent magnets are also employed to seal hermetically on one or both sides of a ball bearing.

A multiple-stage pressure capacity-type ferrofluid seal apparatus is described, for example, in U.S. Pat. No. 3,620,584, Issued Nov. 16, 1971, which patent describes a multiple-stage ferrofluid seal apparatus employing an annular permanent magnet and a plurality of separate spaced apart ferrofluid O-ring seals extending about the surface of the shaft element to be sealed, each seal providing its own defined pressure capacity and employing two pole pieces, one on either side of the annular, axially polarized, permanent magnet.

In addition, magnetic bearing systems, such as a ball bearing, have been used to support a rotary shaft and to permit the low friction rotation thereof and have employed ferrolubricants retained within the confines of the inner and outer race of the ball bearing assembly, such as, for example, described in U.S. Pat. No. 3,977,739, Issued Aug. 31. 1976.

British Pat. No. 783881, Published in October of 1957 relates to a magnetic seal wherein a plurality of axially stacked separate magnetic seals are placed about a rotary shaft to form a plurality of magnetic barriers or seals about the rotary shaft. The seal, so prepared, comprises a plurality of separately stacked, axially polarized, permanent magnets and separate pole pieces to form a multiple-stage, pressure capacity-type seal.

It is desirable to provide a pressure capacity-type ferrofluid seal apparatus which is more compact than conventional, multiple-stage ferrofluid seal apparatus, and which seal apparatus may be constructed at lower cost with the use of lower magnetic power consumption and yet have the same or substantially the same pressure capacity, as required in the prior art ferrofluid seal apparatus.

SUMMARY OF THE INVENTION

The invention relates to a radially polarized multiple-stage ferrofluid seal apparatus and method, and more particularly to a low cost, compact, radially polarized, multiple-stage ferrofluid seal apparatus and system containing bearings wherein the magnetic flux circuit is completed through the housing and through the adjacent bearing system.

A radially polarized, multiple-stage ferrofluid seal apparatus has been discovered which has significant advantages over the prior art multiple-stage seal apparatus, in that the seal apparatus of the invention has a high magnetic efficiency due to a shorter magnetic flux path length, a reduction of flux leakage outside of the seal; and which seal apparatus is compact in size, particularly in axial length due to the reduced number of components of the ferrofluid seal; and further, which seal is of low cost due to the absence of pole pieces in the radially polarized ferrofluid seal apparatus. In one embodiment the ferrofluid seal apparatus of the invention has a high pressure capacity, in that the pressure capacity of the seal can be increased without altering the shaft element, but by merely adding radially polarized permanent magnets to the seal apparatus; while further, the seal apparatus avoids the necessity of placing separate stages on the shaft, resulting in a savings in machining costs. The radially polarized, multiple-stage ferrofluid seal apparatus of the invention is particularly useful in the separation of a first and second environment at different pressures, such as being useful as a vacuum rotary shaft seal wherein there are subatmospheric pressures on one side and atmospheric or superatmospheric pressures on another side of the ferrofluid seal.

The radially polarized, multiple-stage seal apparatus of the invention comprises a magnetically permeable housing through which passes a magnetically permeable rotary shaft element, the surface of which shaft element is to be sealed by the formation of a plurality of separate, spaced apart ferrofluid O-ring seals. The housing contains one or more radially polarized permanent magnets, typically an annular, washer-type permanent magnet, a plurality of radial gaps is formed between the one or more polarized ends of the permanent magnet and the surface of the shaft element, either by employing a plurality of separately stacked, but insulated, radially polarized permanent magnets or by a plurality of separately spaced apart knife edges or edges either on one polarized end of the permanent magnet, but more particularly, on the shaft element to define a plurality of spaced apart radial gaps. The ferrofluid seal apparatus includes ferrofluid which forms in the radial gaps to define a plurality of separately spaced apart O-ring ferrofluid seals about the surface of the shaft element. The ferrofluid O-ring seals are formed in the radial gaps leading to a high pressure capacity seal with the pressure capacity of the ferrofluid seal depending upon the energy product of the magnetic material, the magnetization of the ferrofluid, the number of the stages, and the flux density in the air gap. Typically, such ferrofluid multiple-stage seal apparatus would provide for a pressure capacity of greater than 15 psi or more, such as, for example, 15 to 50 psi depending upon the number of stages.

The ferrofluid seal apparatus of the invention comprises one or more magnetically permeable bearing assemblies, typically a ball bearing assembly composed of an inner and outer race, ball bearings, and a cage for the ball bearings adjacent to and in a magnetic flux relationship with one of the radially polarized permanent magnets. Typically, the inner race of the ball bearing assembly is secured to the shaft element and provides relative rotation between the inner and outer race with one or more components or all components of the ball bearing assembly magnetically permeable or the ball bearing assembly having sufficient components to make the ball bearing assembly magnetically permeable to permit the passage of magnetic flux. The radially polarized, multiple-stage ferrofluid seal apparatus of the invention avoids the employment of pole pieces and in one multiple-stage embodiment merely employs an annular, radially polarized, but axially, relatively thick permanent magnet and in another embodiment employs a plurality of relatively thin, annular, washer-type radially polarized magnets, each separated by an insulating material to form a plurality of separate, stacked multiple-stage seals about the surface of the shaft element.

The radially polarized, multiple-stage ferrofluid seal apparatus provides for completion of the magnetic flux circuit with the magnetic flux circuit between the radially polarized magnet, the magnetically permeable housing, at least one magnetically and preferably two magnetically permeable ball bearing assemblies on either side of the annular permanent magnet, the magnetically permeable shaft element and the ferrofluid in the radial gaps forming the multiple-stage radial gap seals.

A ferrofluid, such as a low volatility hydrocarbon or ester ferrofluid, for example, having a viscosity of about to 100 to 2000 cps and a magnetic gauss of about 100 to 1000, for example, 200 to 500 gauss is retained in the plurality of the radial gaps through the magnetic flux lines from the radially polarized annular permanent magnet. Thus, the radially polarized, multiple-stage ferrofluid seal apparatus employs the magnetically permeable bearing assemblies on either side of the annular permanent magnet and the housing to complete the magnetic flux circuit or employs a plurality of stacked annular permanent magnets separately insulated from each other, together with one magnetically permeable ball bearing assembly to complete the magnetic flux through the magnetically permeable housing. In the embodiment where a plurality of relatively thin, stacked, washer-type radially polarized permanent magnets are employed, the polarized end of the magnet which forms the radial gaps with the surface of the shaft element may be formed of various designs; that is, may be knife like, trapezoidal like, tapered or of other designs in order to provide for the desired concentration of magnetic flux. Thus, by altering the polarized end of the radially polarized permanent magnet, the concentration of flux within the radial gap can be altered as desired.

The invention will be described for the purposes of illustration only in connection with certain embodiments; however, it is recognized that those persons skilled in the art may make various changes, modifications, and improvements therein all falling within the spirit and scope of the present invention.

DESCRIPTION OF THE EMBODIMENTS

Figure 1:
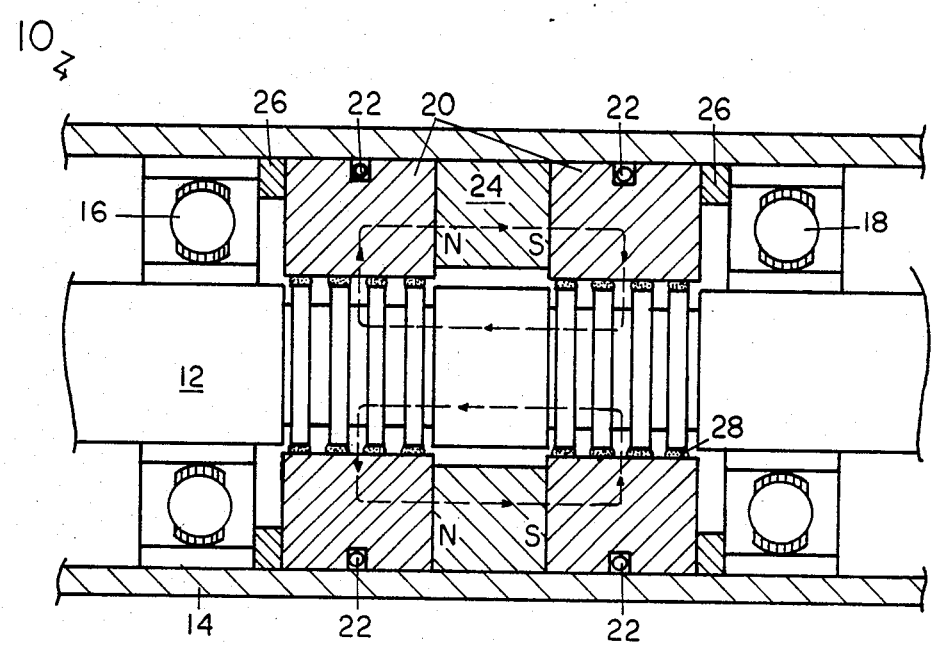
FIG. 1 is a schematic sectional illustration of a conventional dual pole piece, multiple-stage ferrofluid seal apparatus.

FIG. 1 illustrates a prior art vacuum-type ferrofluid system 10 composed of a magnetically permeable rotary shaft 12, a nonmagnetic housing 14, and a pair of ball bearings 16 and 18 to support the shaft 12, with the inner race secured to the outer surface of the shaft 12. An annular, axially polarized permanent magnet 24 is employed and on either side are first and second pole pieces 20. The one end of the pole pieces forming a plurality of radial gaps with the surface of the shaft element 12 to define a plurality of separate, ferrofluid, O-ring seals 28 about the surface of the shaft element. The ball bearings are typically magnetically permeable; and therefor, a spacer 26 of nonmagnetic material is employed to insulate the ball bearings 16 and 18 from the dual pole piece ferrofluid multiple-stage seal. In the conventional seal 10, the magnetic flux circuit is completed through the shaft, the pole pieces, the permanent magnet and the ferrofluid in the multiple-radial gaps, as illustrated in the dotted lines shown in the drawing. Due to the high concentration of magnetic flux lines in the radial gaps between the pole pieces and the shaft, the ferrofluid is retained in separate stages, the number of stages depending upon the pressure capacity desired of the multiple-stage seal. These ferrofluid O-rings provide a hermetic barrier; for example, between a vacuum on one side of the ferrofluid seal; and for example, the atmosphere on the other side. The pressure capacity of the ferrofluid seal is a function of the magnetic flux density in the radial gaps, the number of stages employed, and the saturation magnetization of the ferrofluid. The gasket-type O-ring seal 22 is employed as a static seal between the housing 14 and the pole pieces 20.

Figure 2:
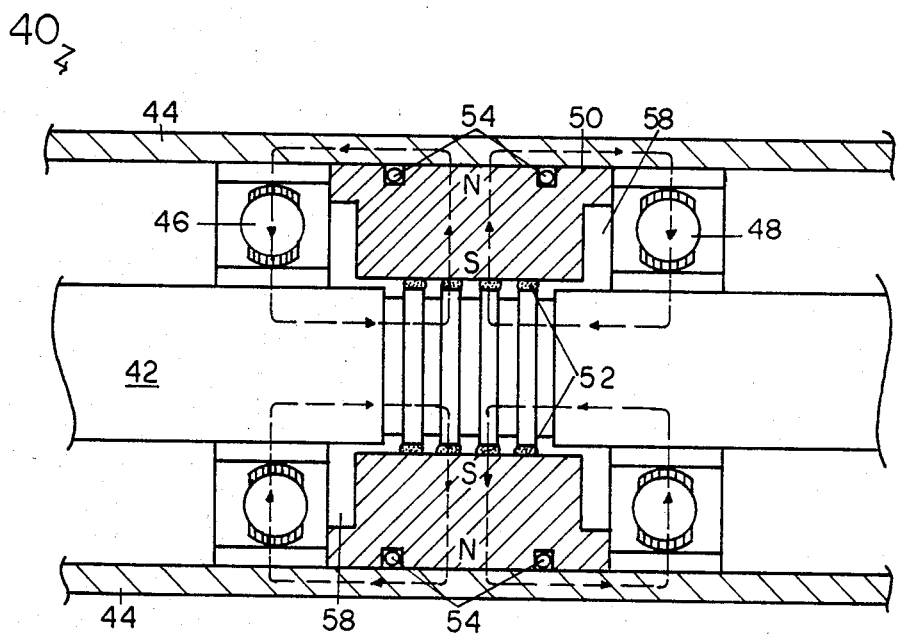
FIG. 2 is a schematic illustrative part sectional view of a radially polarized, multiple-stage ferrofluid seal apparatus of the invention.

FIG. 2 shows a radially polarized, multiple-stage seal apparatus 40 of the invention which includes a magnetically permeable shaft element 42 within a magnetically permeable housing 44; for example, the shaft and housing of a magnetically permeable metal wherein the shaft is supported on either side with magnetically permeable ball bearings 46 and 48. An annular radially polarized permanent magnet 50 is disposed about the shaft element. The shaft element 42 includes a plurality of separate, serrated edges on the shaft which are disposed opposite the one polarized end of the radially polarized permanent magnet 50 to provide for a plurality of defined radial gaps between the edges on the shaft element and the flat end of the polarized end of the permanent magnet 50. Of course, if desired, the edges may be formed in the polarized end of the magnet 50 rather than in the shaft. A ferrofluid 52 is retained within the separate radial gaps to form a plurality of separate, spaced apart ferrofluid O-ring seals about the surface of the shaft element, while the annular, permanent, radially polarized permanent magnet 50 is statically sealed within the housing by the use of elastomeric-type O-ring gaskets 54, such as Viton gaskets. The axial ends of the permanent magnet 50 are disposed, so as to provide for a short annular, radially extending air space 58 extending outwardly from the shaft element, so that the permanent magnet 50 is placed in direct contact with the magnetically permeable bearings 46 and 48 at the outer peripheral edges. The magnetic flux path or ciruit is illustrated by the dotted lines in FIG. 2.

In operation the magnetic flux, as illustrated, passes through the radially polarized magnet 50, the housing 44, the bearing 46 on one side, the bearing 48 on the other side, the shaft element 42, and the ferrofluid 52 in the radial gaps. The use of a magnetically permeable ball bearing on both sides of the radially polarized permanent magnet 50 provides for full pressure saturation and higher pressure capacity, since there is magnetic flux passing on each side of the permanent magnet 50. Of course, if desired, one of the ball bearings 46 or 48 may be nonmagnetically permable or may be removed, so that the magnetic fluix would only pass through the remaining one bearing system. However, this may lead to a slightly lower pressure capacity, in that the magnetic flux saturization of the radial gaps on the far side of the magnetically permeable bearing may not come to full saturation depending upon the strength and the width of the magnet. The radially polarized, multiple-stage seal apparatus 40 is compact and of low cost, since it avoids the necessity for a pole piece.

Figure 3:
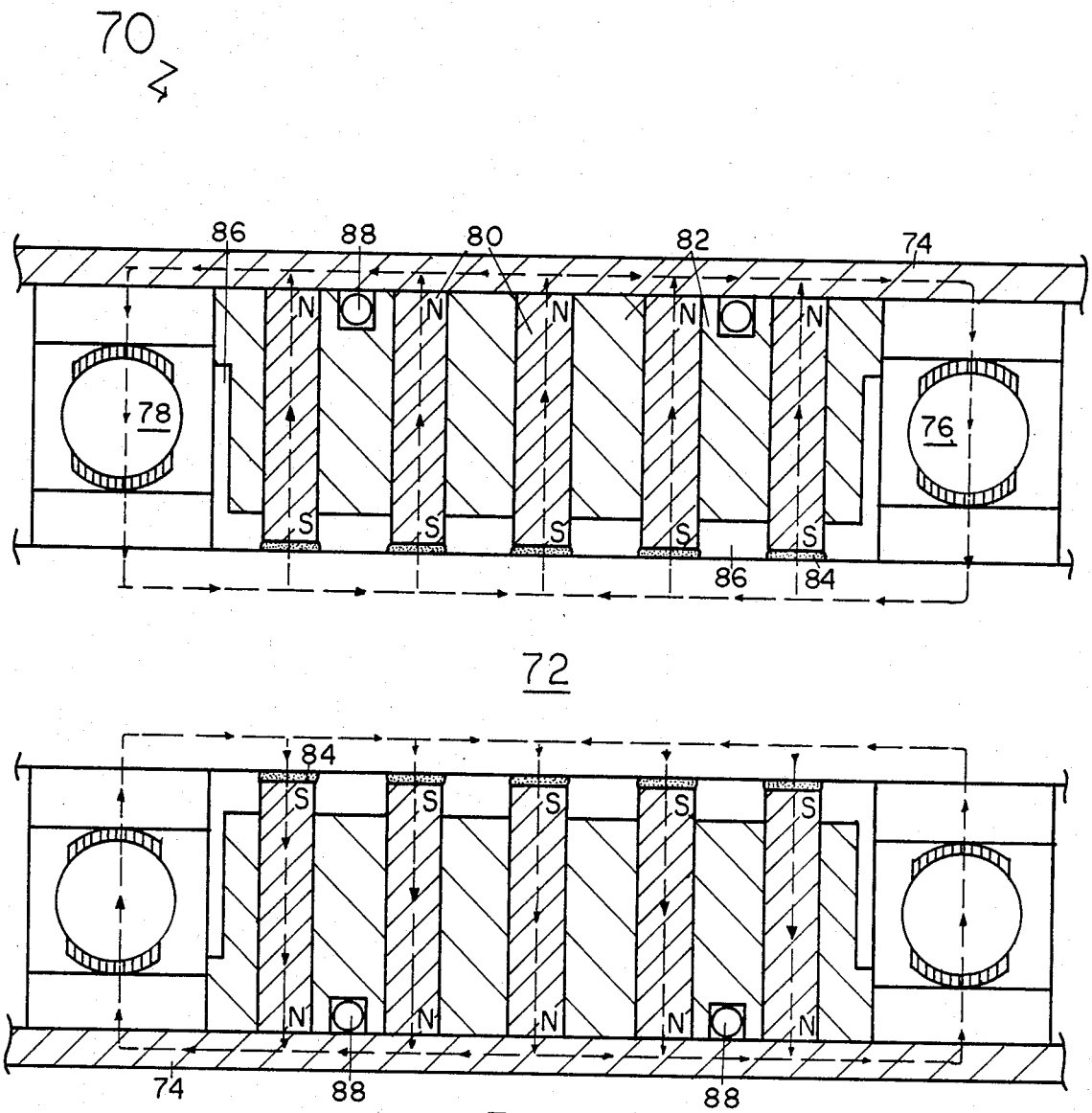
FIG. 3 is a schematic illustrative half sectional view of another embodiment of a radially polarized, stacked multiple-stage ferrofluid seal apparatus of the invention.

FIG. 3 is an illustrative, schematic, half sectional multiple-stage ferrofluid seal apparatus of the invention 70 which comprises a magnetic permeable rotary shaft element 72 within a magnetically permeable housing 74 through which the shaft element passes and the shaft element being supported by a pair of magnetically permeable ball bearings 76 and 78 and between the bearings are disposed a plurality of relatively thin radially polarized permanent magnets 80, each magnet separated by nonmagnetic spacer 82 and with one polarized end of the magnet extending into a close, noncontacting relationship at the surface of the shaft element 72 to form a radial gap and ferrofluid 84 in the radial gap to form a plurality of spaced apart ferrofluid O-ring seals about the surface of the shaft element 72, thereby providing a pressure capacity-type multiple-stage ferrofluid seal. A static Viton or elastomeric O-ring seal 88 is employed to seal the end spacers in the housing. An annular air space 86 radially extends from the surface of the shaft element adjacent the nonmagnetic spacers 82 at each end and adjacent the bearings 76 and 78 is employed, so as to provide for contact of the end spacers with the outer peripheral surface of the bearings 76 and 78.

The polarized ends of the relatively thin and flat, permanent magnets are shown as flat surfaces; however, the polarized end to form the radial gaps and the O-ring seals may be composed of various structural designs including a tapered design, a notched design, a knife edge, and similar designs in order to promote the desired degree of concentrated magnetic flux in the radial gap. The flux path throughout the multiple-stage ferrofluid seal is shown in the dotted lines with the magnetic flux passing through each of the magnetically permeable bearings 76 and 78 and through the surrounding housing 74 and the shaft as well as all the permanent magnets 80 and the ferrofluid captured in the magnetic flux lines 84 to form the multiple seals. Of course, if desired, and as with the ferrofluid seal of FIG. 2 only one of the bearings need be a magnetically permeable bearing or only one bearing employed. However, this is often not desirable, since it might lead to pressure variance throughout the axial extent of the multiple-stage seal.

The design shown in FIG. 2 and FIG. 3 are the preferred design to provide saturization and full pressure capacity. In FIG. 2 the permanent magnet 50 is relatively thick, so that direct contact between the magnetic permeable bearings 46 and 48 is possible without diminution of the magnetic flux, so that the magnetic flux will pass through the housing as well as the bearing and the magnet. In the embodiment illustrated in FIG. 3 the permanent magnets are relatively thin; for example, 20 to 100 mils to represent, in fact, a flat washer-type radially polarized magnet, for example of 30 to 60 mils thickness. Therefor, it is desirable to employ a nonmagnetic spacer, so as to cause the magnetic flux path from the thin, radially polarized magnets not to pass directly into the magnetically permeable bearings 76 and 78, but rather through the magnetically permeable housing 74 and then through the bearings. If desired, a relatively thick radially polarized permanent magnet may be used, for example, at each end of the seal and the end spacer omitted, so that direct contact of the thick magnet with the magnetically permeable bearings will not lead to an alteration in the magnetic flux circuit path.

The pressure capacity of the multiple-stage ferrofluid seal in FIG. 3 can be increased as desired by the applications of additional stacked permanent magnets and spacers. The pressure capacity also depends on the energy product of the magnetic material employed as the permanent magnet, which may be a metallic metal material, Plastiform, ceramic, or other materials, such as a polymer-like nylon containing ferrite or ferrite-like materials, the number of radially polarized magnets, the magnetization of the ferrofluid, and the amount of the radial gap, for example, typically 1–8 mils. As related, the magnetic flux density can be increased in the particular radial gap by changing the inside polarized end shape of the magnet which forms the radial gap or by altering the surface of the shaft element. The multiple-stage ferrofluid seal apparatus of FIG. 3 has a high pressure capacity, since the pressure capacity can be altered as desired by varying the number of radially polarized permanent magnets used without any alteration in the shaft structure as compared to the embodiment shown in FIG. 2. The ferrofluid seal apparatus is also of high efficiency and reduced flux leakage due to the employment of the nonmagnetic spacers which direct the magnetic flux path as desired. There is also a savings in machining costs, since a regular smooth surface shaft may be employed and that the radial gaps do no have to be formed on the shaft as, for example, in FIG. 2.

The radially polarized, multiple-stage ferrofluid seal apparatus, as illustrated, is a low cost compact ferrofluid seal apparatus which is particularly useful in sealing computer disc spindles, textile spindles, or where there is a difference in pressure across the multiple-stage ferrofluid seals, such as in vacuum sealing of shafts as in rotating X-ray anodes wherein one environment or one side of the multiple-stage ferrofluid seal must be maintained at at low vacuum pressure and the opposite side is at atmospheric pressure.

What is claimed is:

1. A radially polarized, multiple-stage ferrofluid seal apparatus which comprises:
    (a) a magnetically permeable housing;
    (b) a magnetically permeable shaft element to be sealed and extending within the housing;
    (c) a magnetically permeable bearing means to support the shaft element;
    (d) a radially polarized permanent magnet means to provide a source of magnetic flux and having a one and another end, one polarized end extending into a close, noncontacting relationship with the surface of the shaft element to form a plurality of radial gaps between the polarized end and the surface of the shaft element;
    (e) ferrofluid retained in the radial gaps to form a plurality of O-ring ferrofluid seals about the surface of the shaft element; and
    (f) the bearing means and the other end of the radially polarized magnet in a magnetic flux relationship to provide a magnetic flux circuit between the permanent magnet means, the housing, the bearing means, the shaft, and the ferrofluid in the radial gaps.

2. The apparatus of claim 1 wherein the radially polarized magnet means comprises an axially, relatively thick, single permanent magnet means and wherein the magnetic permeable bearing means is adjacent to and in direct magnetic flux contact with at least one axial end of the relatively thick, radially polarized permanent magnet means.

3. The apparatus of claim 2 wherein the shaft element is characterized by a plurality of radial ridges on the surface of the shaft element, which ridges form radial gaps with the polarized other end of the radially polarized permanent magnet means.

4. The apparatus of claim 1 wherein the bearing means comprises a pair of bearing means, the bearing means on either side of the radially polarized permanent magnet means and within the housing.

5. The apparatus of claim 1 wherin the bearing means comprises a ball bearing means.

6. The apparatus of claim 1 which is characterized by a radially extending air space extending outwardly from the surface of the shaft element between the permanent magnet means and the bearing means wherein the bearing means and the radially polarized magnet means are placed in a magnetic flux relationship through the magnetic permeable housing.

7. The apparatus of claim 1 wherein the radially polarized magnet means comprises a plurality of relatively thin, radially polarized permanent magnets with the poles of the same polarity of the magnets disposed in the same radial direction, each of the magnets separated by a nonmagnetic insulating element to define a plurality of radial gaps with at least one radial gap under the one polarized end of each of the radially polarized thin permanent magnets.

8. The apparatus of claim 7 wherein the relatively thin permanent magnets have an axial thickness of ranging from about 20 to 100 mils.

9. A radially polarized, multiple-stage ferrofluid seal apparatus which comprises:
 (a) a magnetic permeable housing;
 (b) a magnetic permeable shaft element to be sealed extending through the housing, the shaft element characterized by a plurality of spaced apart ridges on the shaft element;
 (c) a first and second magnetic permeable ball bearing means to support the shaft element within the housing;
 (d) a single, relatively thick, radially polarized permanent magnet having a one on another polarized end, one polarized end of the permanent magnet extending into a close, noncontacting relationship with the surface of the shaft element containing ridges to form a plurality of separate radial gaps with the surface of the shaft element;
 (e) ferrofluid retained in the radial gaps to form a plurality of separate, spaced apart O-ring ferrofluid seals about the surface of the shaft element; and
 (f) the first ball bearing means adjacent one of the axial sides and the second ball bearing means adjacent the opposite axial side of the single, radially polarized permanent magnet and each ball bearing means in a magnetic flux relationship with the single radially polarized permanent magnet to provide a magnetic flux circuit between the single, radially polarized permanent magnet, the housing, the first and second bearing means, the shaft, and the ferrofluid in the radial gaps.

10. A radially polarized, multiple-stage ferrofluid seal apparatus which comprises:
 (a) a magnetically permeable housing;
 (b) a magnetically permeable shaft element to be sealed and extending through the housing, the shaft having a smooth surface;
 (c) a first and second magnetic permeable bearing means to support the shaft element within the housing;
 (d) a plurality of separate radially polarized relatively thin permanent magnets, each permanent magnet having a one on the other polarized end, one polarized end of each of the magnets extending into a close, noncontacting relationship with the surface of the shaft element to form a plurality of radial gaps with the smooth surface of the shaft element with the polarity of the magnets in the same radial direction, the permanent magnets having a thickness of generally less than about 100 mils;
 (e) a plurality of nonmagnetically permeable insulating elements placed between each of the thin radially polarized permanent magnets and between the permanent magnet and the first and second bearing means,
 (f) ferrofluid retained in the radial gaps under one end of the thin permanent magnets to form a plurality of separate O-ring ferrofluid seals about the surface of the shaft element to define a pressure capacity ferrofluid seal apparatus; and
 (g) the first and second magnetically permeable bearing means and the other polarized end of the plurality of radially polarized magnets in a magnetic flux relationship provide a magnetic flux circuit between the plurality of permanent magnets, the first and second bearing means, the shaft element, the housing, and the ferrofluid in the radial gaps.

11. The apparatus of claim 1 wherein a ferrolubricant is used to lubricate the magnetically permeable bearing means.

12. The apparatus of claim 7 wherein the shaft element which forms the radial gaps has a smooth surface, and the radial gaps are formed by the polarized ends of the thin radially polarized permanent magnets.

* * * * *